(12) United States Patent
Patel

(10) Patent No.: US 11,542,974 B2
(45) Date of Patent: *Jan. 3, 2023

(54) WALL MAGNET ANCHOR SYSTEM

(71) Applicant: Varun Jay Patel, China Grove, NC (US)

(72) Inventor: Varun Jay Patel, China Grove, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/185,105

(22) Filed: Feb. 25, 2021

(65) Prior Publication Data

US 2021/0245272 A1 Aug. 12, 2021

Related U.S. Application Data

(63) Continuation of application No. 16/789,018, filed on Feb. 12, 2020, now Pat. No. 10,933,477.

(51) Int. Cl.
| | | |
|---|---|---|
| *F16B 13/00* | (2006.01) | |
| *F16B 25/00* | (2006.01) | |
| *B23B 51/04* | (2006.01) | |
| *B23B 51/08* | (2006.01) | |
| *B25B 31/00* | (2006.01) | |
| *F16B 1/00* | (2006.01) | |

(52) U.S. Cl.
CPC ........ *F16B 13/002* (2013.01); *F16B 25/0026* (2013.01); *B23B 51/0426* (2013.01); *B23B 51/08* (2013.01); *B25B 31/00* (2013.01); *F16B 13/00* (2013.01); *F16B 13/003* (2013.01); *F16B 2001/0035* (2013.01); *Y10T 29/5108* (2015.01); *Y10T 408/8957* (2015.01)

(58) Field of Classification Search
CPC ...... F16B 13/00; F16B 13/002; F16B 13/003; F16B 25/0026
USPC ...................................... 411/16, 29
See application file for complete search history.

(56) References Cited

U.S. PATENT DOCUMENTS

| | | | |
|---|---|---|---|
| 2,521,885 | A | 9/1950 | Vasquez |
| 2,742,250 | A | 4/1956 | Cronberger |

(Continued)

FOREIGN PATENT DOCUMENTS

| | | |
|---|---|---|
| CN | 102132049 | 7/2011 |
| CN | 107076194 | 8/2017 |

(Continued)

OTHER PUBLICATIONS

Extended European Search Report for Serial No. EP21156844.9, from the European Patent Office, dated Jul. 14, 2021, pp. 1-5.

(Continued)

*Primary Examiner* — Roberta S Delisle
(74) *Attorney, Agent, or Firm* — The Concept Law Group, PA; Scott D. Smiley; Scott M. Garrett

(57) ABSTRACT

A wall magnet anchor system is used to install magnetic anchors in wall material that can be used to magnetically hold an object to the wall, thereby avoiding the need to a conventional hook that protrudes from the surface of the wall. The anchor can include a helical thread to hold the anchor in the wall. An installation tool includes a cutting features at one end for cutting a hole in a wall to receive an anchor, and an installation feature that engages the anchor and allows a user to drive the anchor, through rotation, into the hole cut by the cutting features.

17 Claims, 17 Drawing Sheets

(56) References Cited

U.S. PATENT DOCUMENTS

| | | | |
|---|---|---|---|
| 4,085,337 | A | 4/1978 | Moeller |
| 4,223,587 | A | 9/1980 | Deutschenbaur |
| 4,875,654 | A | 10/1989 | Chandonnet et al. |
| 5,190,425 | A | 3/1993 | Wieder |
| 5,630,688 | A | 5/1997 | Tran |
| 6,935,821 | B2 | 8/2005 | Bodin et al. |
| 7,056,075 | B2 | 6/2006 | Powers et al. |
| 8,397,411 | B2 | 3/2013 | Russo et al. |
| 9,140,001 | B1 | 9/2015 | Hohmann, Jr. |
| 9,284,973 | B2 | 3/2016 | Hoffman |
| 9,464,648 | B1 | 10/2016 | Smith et al. |
| 9,631,661 | B2 | 4/2017 | Vivier et al. |
| 9,926,708 | B1 | 3/2018 | Janko |
| 10,030,686 | B2 | 7/2018 | Vivier et al. |
| 10,933,477 | B1* | 3/2021 | Patel ............... F16B 13/002 |
| 2004/0052606 | A1 | 3/2004 | Kerl |
| 2008/0310930 | A1* | 12/2008 | Schaeffer ............. B23B 37/00 175/395 |
| 2010/0230909 | A1 | 9/2010 | Bayerl et al. |
| 2017/0159285 | A1 | 6/2017 | Hohmann, Jr. |
| 2018/0238367 | A1 | 8/2018 | Laue |
| 2019/0208931 | A1 | 7/2019 | Carmona |
| 2021/0245272 | A1* | 8/2021 | Patel ............... F16B 25/0026 |

FOREIGN PATENT DOCUMENTS

| | | |
|---|---|---|
| CN | 108317144 | 7/2018 |
| CN | 110446574 | 11/2019 |
| DE | 20113578 | 10/2001 |
| DE | 10117200 | 10/2002 |
| DE | 10156311 | 6/2003 |
| DE | 102007005280 | 10/2007 |
| DE | 102009037483 | 2/2011 |
| DE | 202019002121 | 12/2019 |
| EP | 0425358 | 5/1991 |
| EP | 0463278 | 1/1992 |
| EP | 1400704 | 3/2004 |
| FR | 2830583 | 4/2003 |
| GB | 558035 | 12/1943 |
| GB | 1460727 | 1/1977 |
| WO | 2004082875 | 9/2004 |
| WO | 2020003121 | 1/2020 |
| WO | 2020040629 | 2/2020 |

OTHER PUBLICATIONS

Office Action Application for Serial No. 202110023289.9, from China National Intellectual Property Administration, dated May 26, 2022.

* cited by examiner

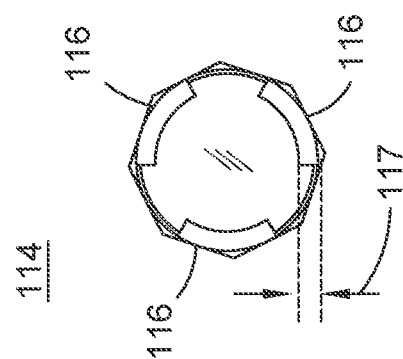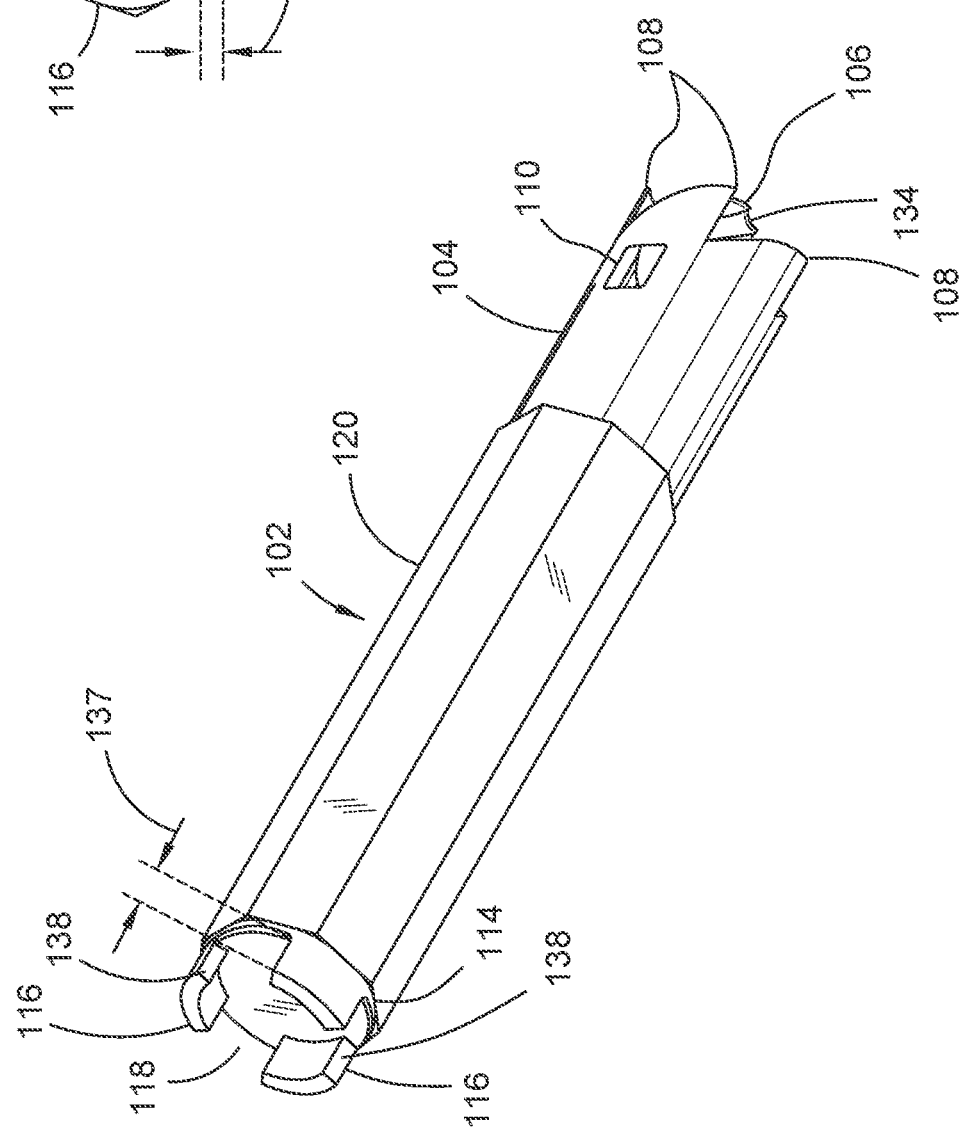

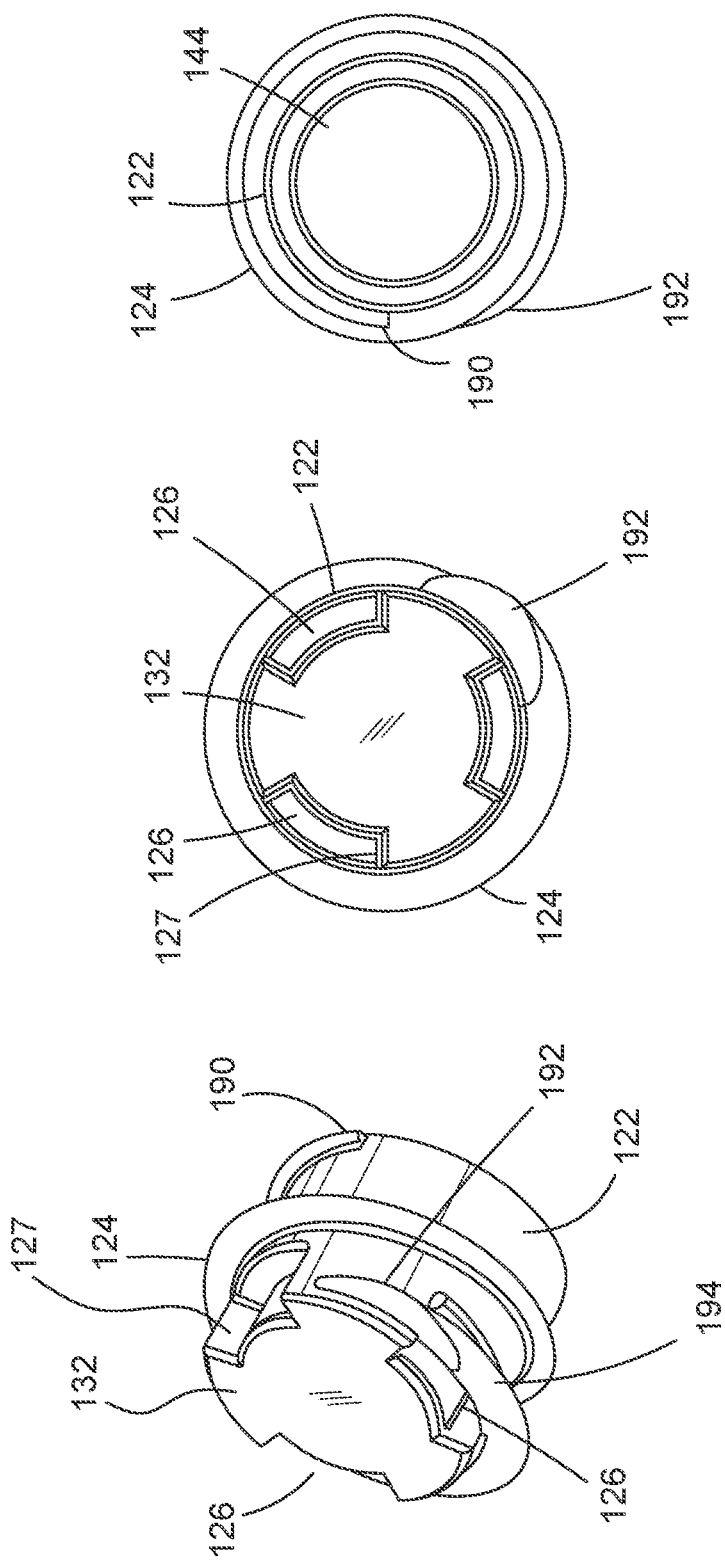

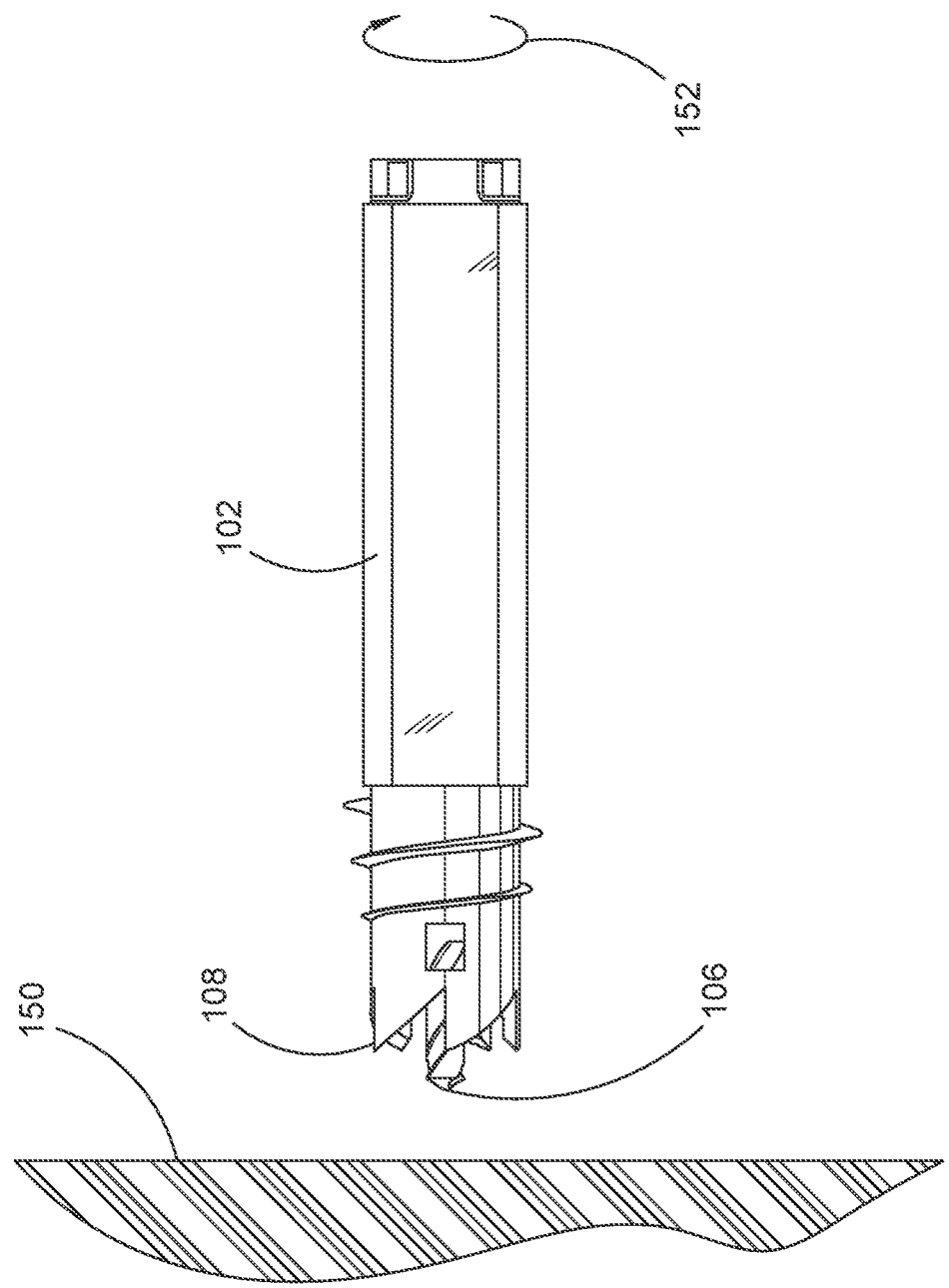

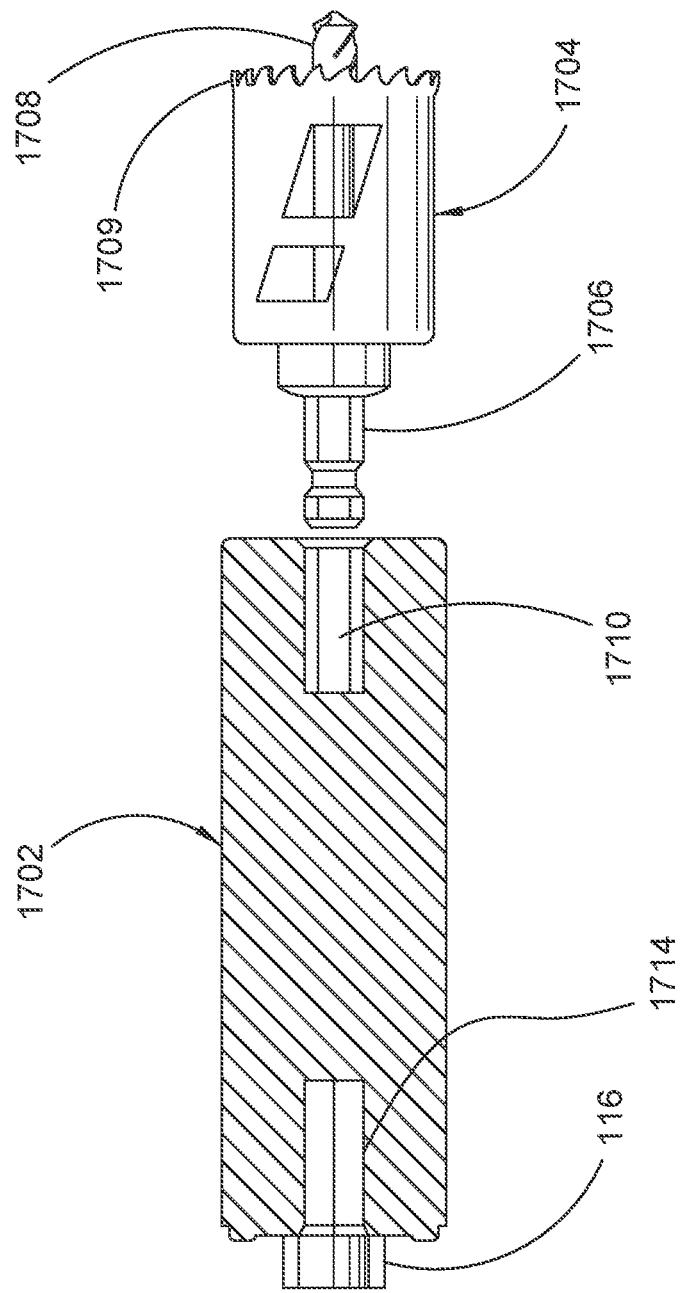

WALL MAGNET ANCHOR SYSTEM

CROSS REFERENCE

This application is a continuation application of U.S. application Ser. No. 16/789,018, filed Feb. 12, 2020, and titled "Wall Magnet Anchor System," and which has been granted as U.S. Pat. No. 10,933,477, the entirety of which is hereby incorporated by reference.

FIELD OF THE INVENTION

The present invention relates generally to anchoring devices for hanging objects on walls, and more particularly to an anchoring system that does not use a hook and which can be concealed in a wall.

BACKGROUND OF THE INVENTION

Conventional wall hanging fixtures involve anchoring a hook into a wall, where the hook is used to hold a wire or string or similar feature on the back of an object to be hung. Typical objects hung on walls include, for example, mirrors, pictures, paintings, photographs, documents, and so on. An anchor is a plastic structure having a threading on its outside and a space along its axis. A pilot hole can be first drilled into the wall material, and then the anchor is screwed into the wall, and then a screw is screwed into the center of the anchor, where the screw holds a hook. Of course, people also sometimes forego the anchor and simply drive a screw or nail into the wall, where the nail supports a hook. However, a properly installed anchor will substantially reduce long term damage to the wall by distributing the force of the weight of the object being supported on the hook over a larger area, reducing stress on the wall material.

Unfortunately, when no object is hung on the hook, the hook and anchor are exposed and visible, which is not desirable, and is usually very noticeable. As a result, the hook/anchor either have to be covered with an object, or removed and the hole patched and painted, or simply left exposed.

Therefore, a need exists to overcome the problems with the prior art as discussed above.

SUMMARY OF THE INVENTION

In accordance with some features of the inventive disclosure, there is provided a wall magnet anchor system that includes a wall cutting and anchor installation tool having an elongated body and a hole cutting feature formed at a first end of the elongated body. The hole cutting feature includes a center pilot like a drill bit and a plurality of cutting teeth formed in a cylindrical portion around the center pilot. The cylindrical portion has an outside diameter, and the center pilot extends from the first end of the elongated body along a longitudinal axis of the elongated body and beyond the plurality of cutting teeth. The tool further includes an anchor engagement feature formed at a second end of the elongated body opposite the first end, and a gripping portion formed between the hole cutting feature at the first end and the anchor engagement feature at the second end. The system also includes one or more anchors, where each anchor has a cylindrical body having an outside diameter equal to the outside diameter of the cylindrical portion of the hole cutting feature. The anchors further have a magnet disposed inside the cylindrical body, and a helical thread formed around the cylindrical body from a first end of the cylindrical body to a second end of the cylindrical body. Additionally, the anchors have a tool engagement feature formed at the second end of the cylindrical body that is configured to mate with the anchor engagement feature of the wall cutting and anchor installation tool.

In accordance with another feature, the center pilot comprises at least one helical cutting edge formed along a length of the center pilot that is configured to cut when the elongated body is rotated about its longitudinal axis.

In accordance with another feature, the helical thread of the anchor extends outward from an outside of the cylindrical body of the anchor by a distance that increases along the helical thread.

In accordance with another feature, first end of the wall cutting and anchor installation tool comprises a window on the cylindrical portion.

In accordance with another feature, the anchor engagement feature comprises a plurality of protrusions that extend from the second end in a direction of the longitudinal axis.

In accordance with another feature, the gripping portion comprises a plurality of flat sides formed along the elongated body of the wall cutting and anchor installation tool.

In accordance with another feature, the tool engagement feature of the anchor comprises a plurality of slots formed in the cylindrical body of the anchor at the second end.

In accordance with some features of the inventive disclosure, there is provided a wall cutting and anchor installation tool that includes an elongated body, and a hole cutting feature formed at a first end of the elongated body. The hole cutting feature incudes a center pilot and a plurality of cutting teeth formed in a cylindrical portion around the center pilot. The cylindrical portion has an outside diameter, and the center pilot extends from the first end of the elongated body along a longitudinal axis of the elongated body and beyond the plurality of cutting teeth. The tool can further include an anchor engagement feature formed at a second end of the elongated body opposite the first end, and a gripping portion formed between the hole cutting feature at the first end and the anchor engagement feature at the second end.

In accordance with another feature, the center pilot comprises at least one helical cutting edge formed along a length of the center pilot that is configured to cut when the elongated body is rotated about its longitudinal axis.

In accordance with another feature, first end of the wall cutting and anchor installation tool comprises a window on the cylindrical portion.

In accordance with another feature, the anchor engagement feature comprises a plurality of protrusions that extend from the second end in a direction of the longitudinal axis.

In accordance with another feature, the gripping portion comprises a plurality of flat sides formed along the elongated body of the wall cutting and anchor installation tool.

In accordance with some features of the inventive disclosure, there is provided an anchor for hanging objects on a wall that includes a cylindrical body having an outside diameter equal to the outside diameter of the cylindrical portion of the hole cutting feature, a magnet disposed inside the cylindrical body, a helical thread helically formed around the cylindrical body from a first end of the cylindrical body to a second end of the cylindrical body, and a tool engagement feature formed at the second end of the cylindrical body that is configured to mate with the anchor engagement feature of the wall cutting and anchor installation tool.

In accordance with another feature, the helical thread of the anchor extends outward from an outside of the cylindrical body of the anchor by a distance that increases along the helical thread.

In accordance with another feature, the tool engagement feature of the anchor comprises a plurality of slots formed in the cylindrical body of the anchor at the second end.

In accordance with another feature, the helical thread comprises a bridge portion over one of the plurality of slots.

In accordance with another feature, each of the plurality of slots have a width that is equal to a thickness of the cylindrical body.

Although the invention is illustrated and described herein as embodied in a wall magnet anchor system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the installation tool. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 4 shows a perspective view of an installation tool for a wall magnet anchor system, in accordance with some embodiments;

FIG. 5 shows an end view of an installation tool for a wall magnet anchor system, in accordance with some embodiments;

FIG. 9C show a perspective view of an anchor for a wall magnet anchor system in which a magnet has been mounted, in accordance with some embodiments;

FIG. 9D shows a front view of an anchor for a wall magnet anchor system in which a magnet has been mounted, in accordance with some embodiments;

FIG. 9E shows a rear view of anchor for a wall magnet anchor system in which a magnet has been mounted, in accordance with some embodiments;

FIG. 10 shows a side view of an installation tool for a wall magnet anchor system being used to cut a hole in a wall to mount an anchor in the wall, in accordance with some embodiments;

FIG. 17 shows a side cutaway view of an installation tool adapted for use with a hole saw, in accordance with some embodiments;

DETAILED DESCRIPTION

Figure 1:
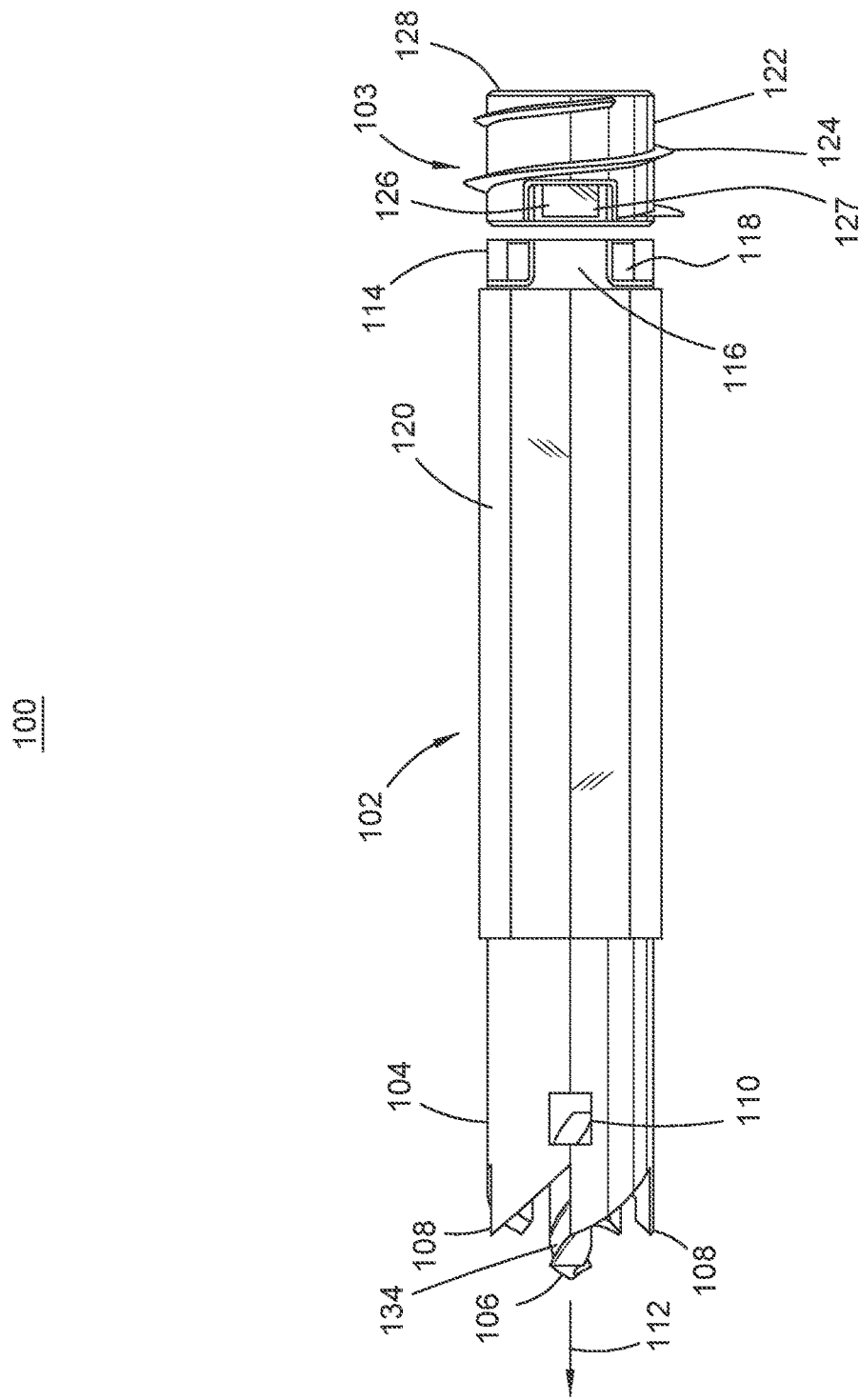
FIG. 1 shows a side view of a wall magnet anchor system, including an anchor and a tool for installing the anchor, in accordance with some embodiments.

While the specification concludes with claims defining the features of the invention that are regarded as novel, it is believed that the invention will be better understood from a consideration of the following description in conjunction with the drawing figures, in which like reference numerals may be used across multiple drawings. However, the fact that different reference numerals may be used in some drawings showing alternative embodiments should not be taken as an indication that such alternative embodiments are patentably distinct. It is to be understood that the disclosed embodiments are merely exemplary of the invention, which can be embodied in various forms.

FIG. 1 shows a side view of a wall magnet anchor system 100, including an anchor 103 and a tool 102 for installing the anchor 103, in accordance with some embodiments. The anchor 103 is designed to house a magnet, and to be installed in a wall, such as a residential wall, that uses sheet rock or drywall or similar materials. The magnet housed in the anchor 103 is used to attract a magnet or ferrous metal element that is affixed to the wall-facing surface of an object (frame, mirror, painting, etc.) to be mounted on the wall. The force of attraction between the anchor and the object, due to the magnet(s) is sufficient to hold the object in place. Of course, the weight of the object must be small enough that magnetic attraction is not overcome by the force of gravity acting on the object.

The installation tool 102 is used to both cut a hole in a wall (drywall), and then to drive the anchor 103 into the hole, where the anchor 103 will then be securely held in place. The installation tool 102 can be manually operated or configured to be used with a power tool such as a drill. The tool 102 has a hole cutting feature at a first end 104 that includes a center pilot 106 and a plurality of cutting teeth 108 formed in a cylindrical portion around the center pilot 106. The center pilot 106 extends from the first end 104 of the elongated body of the tool 102 along a longitudinal axis 112 of the elongated body, and beyond the plurality of cutting teeth 108. That is, the center pilot 106 extends out farther than do the cutting teeth 108. The center pilot 106 is generally cylindrical, resembling a drill bit, and have a helical cutting edge 134. The center pilot 106 therefore makes contact with the surface of the wall before the cutting teeth 108 (when the tool 102 is held such that its axis 112 is perpendicular to the surface of the wall), and create a hole into the wall material when the tool 102 is rotated about the longitudinal axis 112. As the center pilot 106 cuts into the wall material, the cutting teeth 108 with eventually contact the surface of the wall and begin cutting into the wall as well. Thus, the cutting teeth 108 cut in circular hole in the wall around the center pilot 106, wherein the hole cut in the wall will have a diameter equal to that of the outside diameter of the first end 104. A window 110 allows the user to remove the wall material from the tool.

Figure 6:
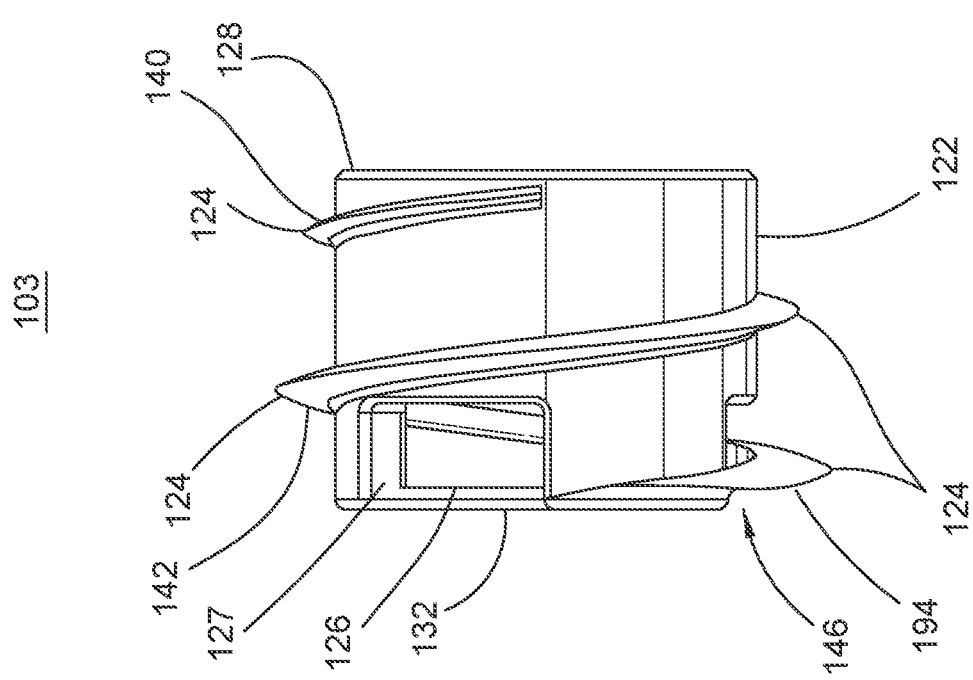
FIG. 6 shows a side view of an anchor for a wall magnet anchor system, in accordance with some embodiments.

The anchor 103, shown in more detail in FIG. 6, has a substantially cylindrical body 122 that has an outside diameter equal to that of the first end 104 of the tool 102. The anchor 103 also has a helical thread 124 on the outside surface of the cylindrical body 122 that extends outward and forms an edge along the helical thread 124. The anchor 103 also includes a magnet 144 inside the cylindrical body 122. After creating the hole in the wall with the cutting features at the first end 104 of the tool 102, the anchor 103 is placed into the hole, with the back end 128 entering the hole. Because the hole cut by the cutting teeth 108 is slightly larger than that of the cylindrical body 122 of the anchor 103, the back end 128 will fit into the hole. However, the helical thread 124 extends outward from the cylindrical body 122, it blocks the anchor 103 from passing into the hole directly. To drive the anchor 103 into the hole, the anchor 103 must be rotated about its axis (e.g. 112 as shown in FIG. 1), causing the helical thread 124 to dig into the wall material in the bore of the hole. That is, the helical thread 124 acts like a tap to allow the anchor 103 to be screwed into the hole. The end of the helical thread 124 closest to the back end 128 is also to shortest, and the helical thread 124 gets taller (from the outside surface of the cylindrical body 122) along the helical thread 124 from the back end 128.

To rotate the anchor 103, there can be a tool engagement feature such as, for example, slots 126 at the front end of the anchor, opposite the back end 128. The tool engagement feature engages a complementary anchor engagement feature on the tool 102 at a second end 114 of the tool 102, such as protrusions 116 and slots 118. The protrusions 116 fit into slots 126 of the anchor 103, while the slots 118 receive the non-slotted portions of the anchor 103. Once engaged, the tool 102 can again be gripped at the gripping portion 120 and rotated about its axis 112 to turn the anchor 103, causing the helical thread 124 to cut into the side of the hole that had been cut by the cutting features of the first end 104. The helical thread 124 thereby holds the anchor 103 in the hole, and can be screwed into the hole until the face (opposite the back end 128) is flush with the wall, or recessed into the wall slightly so that it can be covered and concealed (e.g. spackling and paint).

Figure 2:
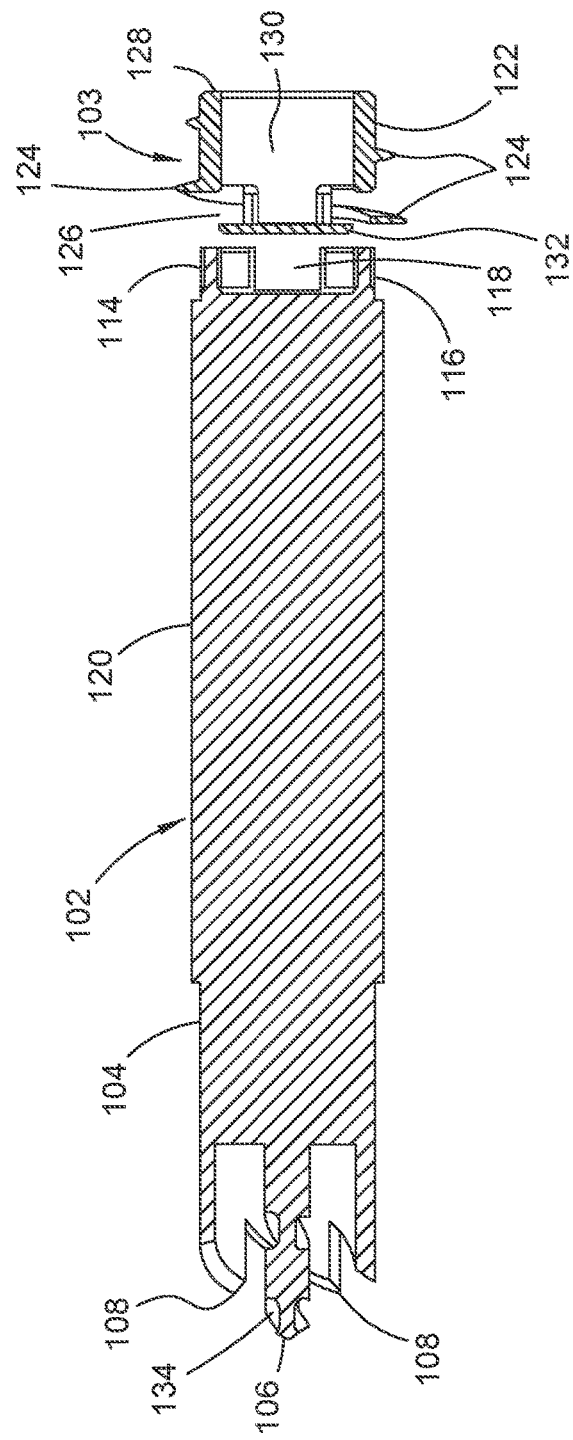
FIG. 2 shows a side cut-away view of an installation tool and anchor for a wall magnet anchor system, in accordance with some embodiments.
Figure 7:
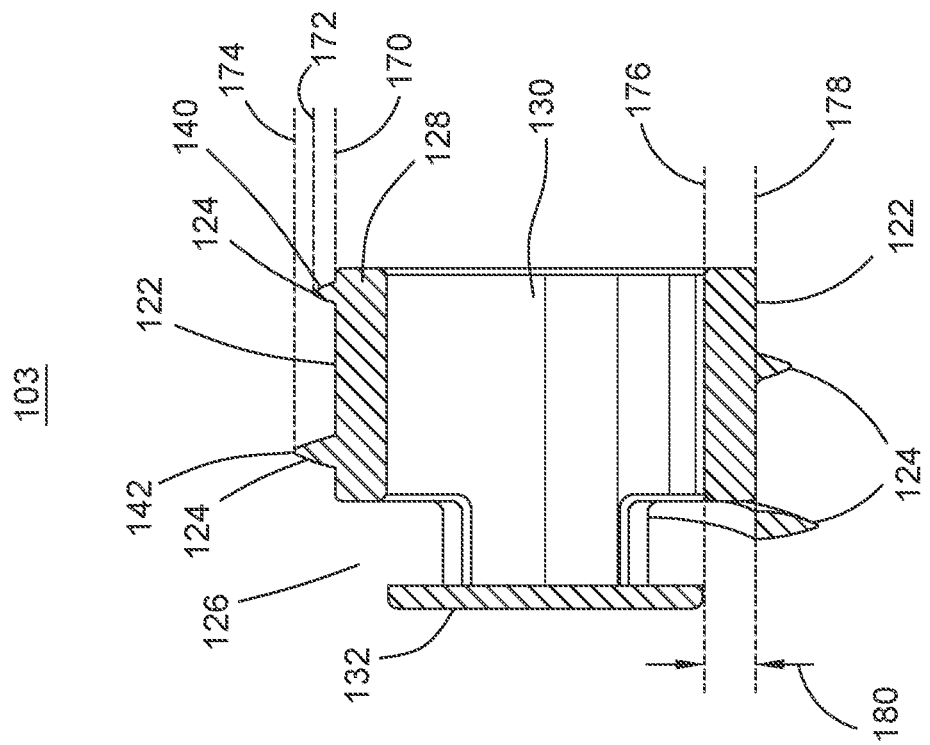
FIG. 7 shows a cut-away side view of an anchor for a wall magnet anchor system, in accordance with some embodiments.

FIG. 2 shows a side cut-away view of an installation tool 102 and anchor 103 for a wall magnet anchor system, in accordance with some embodiments. In this view a cavity 130 in the anchor 103 can be seen. The cavity 130 can be generally cylindrical and can be sized to hold the magnet by frictional engagement with the wall of the cavity 130. The magnet, which inserted into the cavity 130, can be moved into contact with the inside of the front end 132 of the anchor 103. As seen between FIGS. 1 and 2, the helical thread 124 can extend from the back end 128 to the front end 132, winding around the anchor at least once, and about twice in some embodiments. It can also be seen in FIG. 2 that the tool 102 is a unitary element with the various portions being contiguous. The tool 102 can be made of a sufficiently hard polymeric material, metal, or other suitable material. The anchor 103 can be made of the same material as the tool 102 or a different material. FIG. 7 shows the cut-away view of the anchor 103 in more detail.

Figure 3:
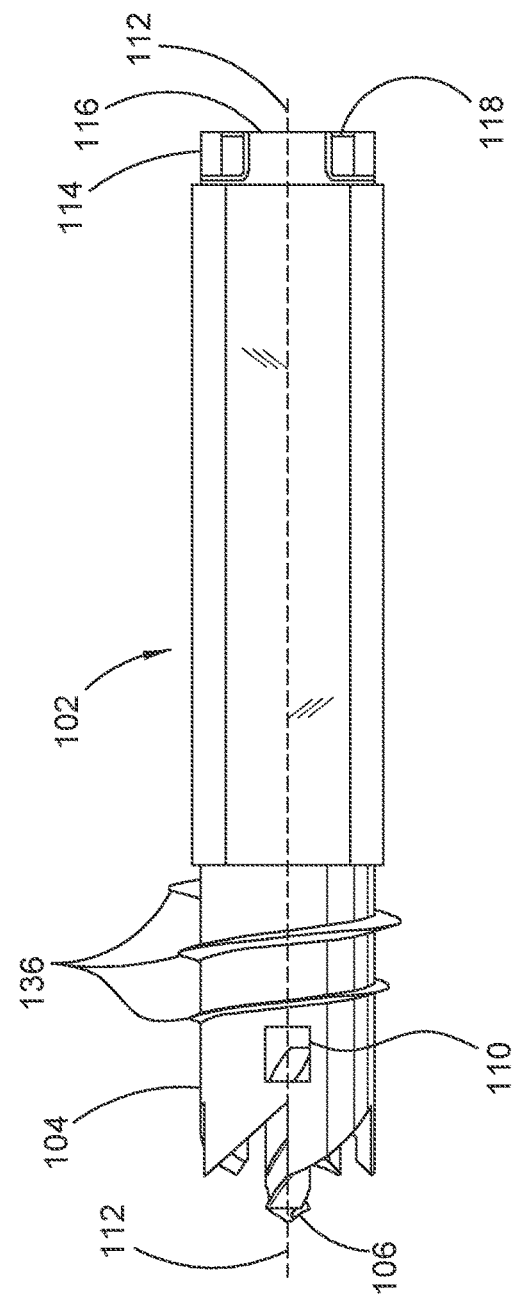
FIG. 3 shows a side view of an installation tool having a tap thread, in accordance with some embodiments.

FIG. 3 shows a side view of an installation tool 102 having a tap thread 136, in accordance with some embodiments. The tap thread 136 can be provided as an optional feature in some embodiments. Using the cutting features 106, 108 a hole can be cut through a wall, but rather than withdraw the tool 102 from the hole, the tool 102, at the first end 104, can be further inserted into the hole such that the tap thread 136 engages the wall. The tap thread 136 is a helical thread that corresponds to the helical thread 124 on the anchor 103, and therefore cuts a counterthread in the side of the hole to receive the helical thread 124 of the anchor 103.

FIG. 4 shows a perspective view of an installation tool for a wall magnet anchor system, in accordance with some embodiments. In this view protrusions 116 can be seen extend from the second end 114 of the tool 102 with slots or gaps 118 between the protrusions 116. The protrusions have sides 138 that bear against corresponding surfaces 127 of the anchor 103 so that rotation of the tool 102 imparts rotation to the anchor 103 when the protrusions 116 are engaged in the slots 126 of the anchor 103. FIG. 5 shows an end view of an installation tool 102, looking at the second end 114 along the axis 112 of the tool 102. In FIGS. 4 and 5 it can be seen that there are, in embodiments represented by these drawings, three protrusion 116 equally spaced around the perimeter of the second end 114, and which extend from the second end 114 along the longitudinal axis of the tool 102. As shown here, the protrusions 116 alternate with the gaps 118, and each of the protrusions 116 and gaps 118 are about the same arc-length around the circular perimeter of the second end 114. The protrusions 116 have a thickness or width 117 that is substantially equal to the width of the slots 126 of the anchor 103. The protrusions 116 also have a height 137 in which they extend from the second end 114 that is substantially equal to the depth of the slots 126 of the anchor.

FIGS. 6-7 show a side view and a side cut-away view of the anchor 103, respectively, in accordance with some embodiments. In these drawings the helical thread 124 can be seen to increase in height from the back end 128 to the front end 132. For example, a first portion 140 of the helical thread 124 has a height from the outside surface of the cylindrical body 122 from line 170 to line 172, while a second portion 142 of the helical thread has a height from line 170 to line 174, showing how the helical thread 124 increases in height. The increase in height of the helical thread helps ensure the helical thread 124 is tightly engaged with the wall material all along the helical thread 124 when the anchor 103 is installed in a wall. Furthermore, it can be seen that the thickness of the cylindrical body 122 of the anchor 103 is indicated between line 176 and 178, which is the width 180 of the gaps 126, and equal to the width of the protrusions 116 of the tool 102. Additionally, in FIGS. 6-7, it can be seen that the helical thread 124 has a triangular profile, defining an edge along its outer periphery that allows it cut into the wall material when the anchor 103 is installed in a wall. In FIG. 6 a gap 146 is bridged by a bridge portion 194 of the helical thread 124. AN inner surface of the bridge portion 194 follows the shape of the outer surface of the cylindrical wall so that one of the protrusions 116 of the tool 102 can fit between the bridge portion 194 and the rest of the anchor 103. It will be appreciated by those skilled in the art that variations of these features can be used to achieve substantially the same effect. For example, the helical thread 124 can have a consistent height from end to end. There can be fewer, or more gaps 126 and protrusions 116 on the tool 102.

Figure 8:
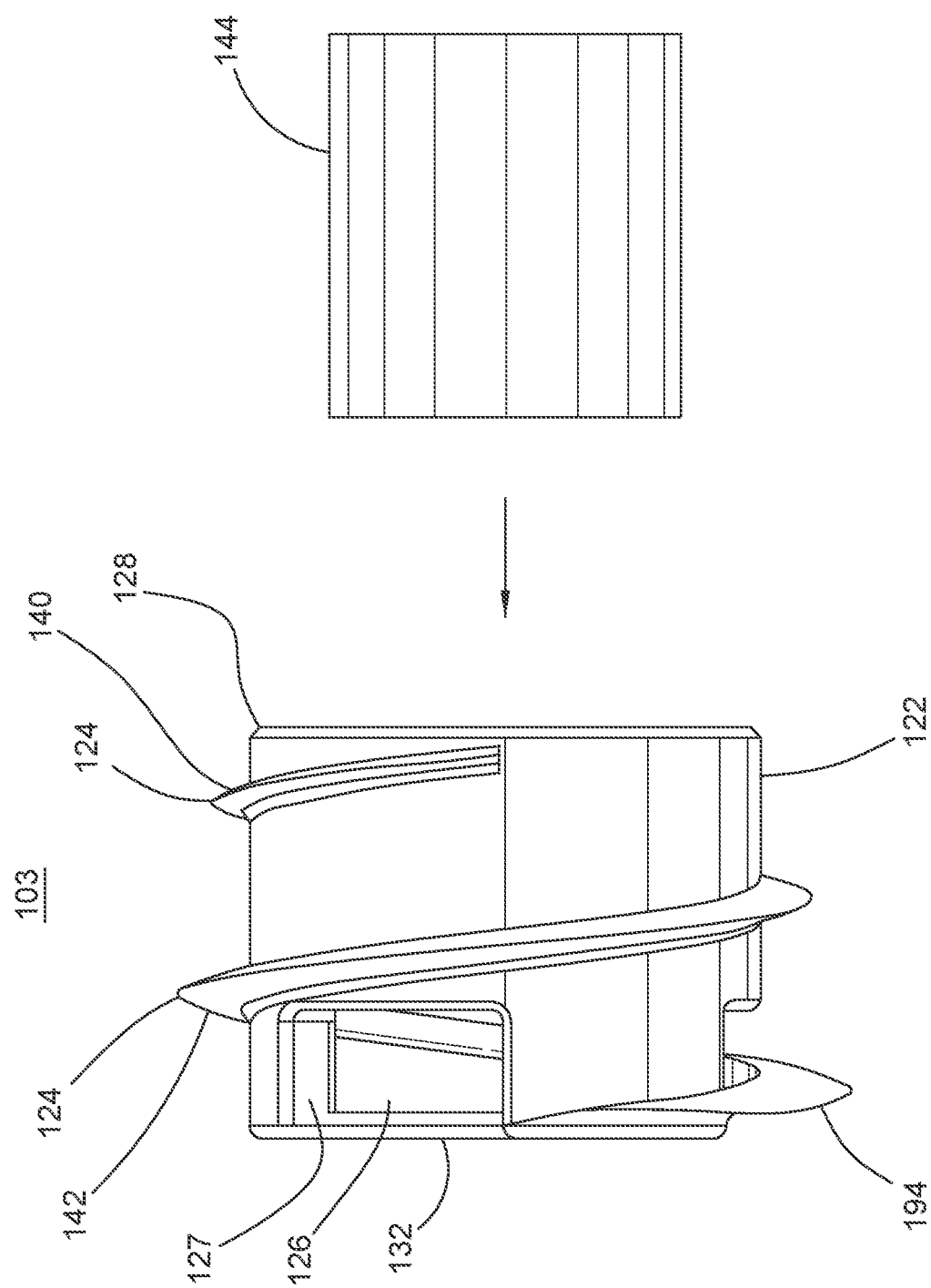
FIG. 8 shows a side view of an anchor for a wall magnet anchor system in which a magnet is being positioned for use, in accordance with some embodiments.

FIG. 8 shows a side view of an anchor 103 for a wall magnet anchor system in which a magnet 144 is being positioned for use, in accordance with some embodiments. The magnet 144 is sized to fit within the cavity 130 of the anchor 103. The walls bordering the cavity can be in contact with the side of the magnet 144, creating static friction that hold the magnet 144 in the anchor 103. Alternatively, the magnet 144 can be glued into the anchor 103.

Figure 9B:
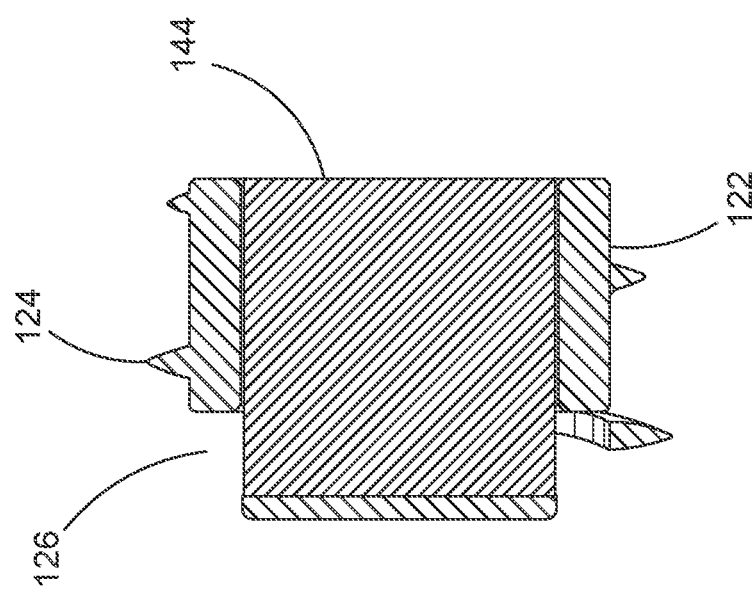
FIG. 9B shows a side cut-away view of an anchor for a wall magnet anchor system in which a magnet has been mounted, in accordance with some embodiments.
Figure 9A:
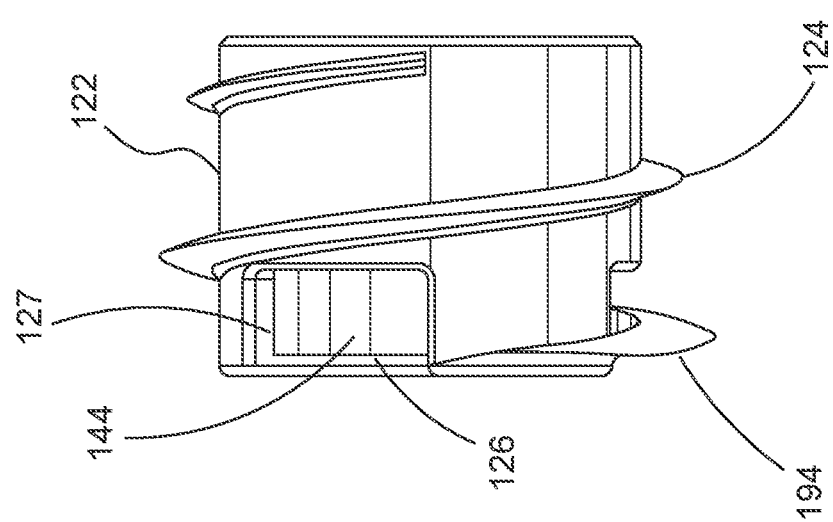
FIG. 9A shows a side view of an anchor for a wall magnet anchor system in which a magnet has been mounted, in accordance with some embodiments.

FIGS. 9A-E show various views of the anchor 103. FIG. 9A shows a side view of an anchor 103 for a wall magnet anchor system in which a magnet 144 has been mounted. FIG. 9B shows a side cut-away view of an anchor for a wall magnet anchor system in which a magnet has been mounted. FIG. 9C show a perspective view of an anchor for a wall magnet anchor system in which a magnet has been mounted. FIG. 9D shows a front view of an anchor for a wall magnet anchor system in which a magnet has been mounted. FIG. 9E shows a rear view of anchor for a wall magnet anchor system in which a magnet has been mounted. The helical thread 124 can be seen in FIG. 9E growing in size as it traverses around and along the cylindrical body 122 of the anchor 103, from a start 190 to the end 192 of the helical thread 124. In FIG. 9C it can be seen that a bridge portion 194 of the helical thread 124 near the end 192 bridges over a gap 126 into which one of the protrusions 116 of the toll 102 fits. Thus, a protrusion 116 will fit between the bridge portion 194 of the helical thread 124 and the anchor 103/ magnet 144. In some embodiments there can be three gaps 126 on the front end 132 of the anchor 103.

Figure 11:
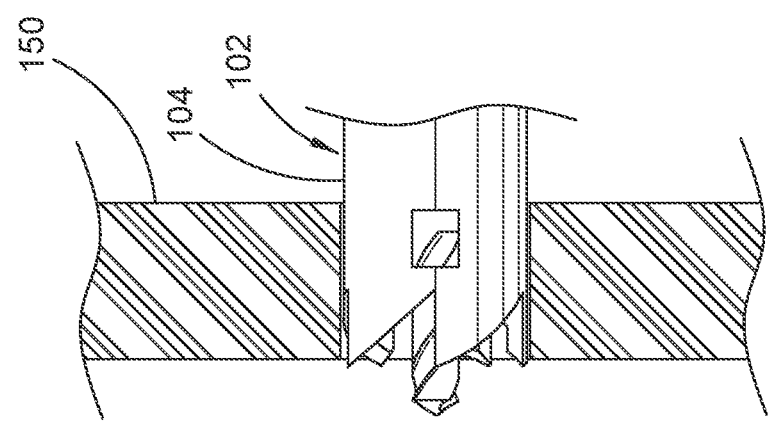
FIG. 11 shows a side view of an installation tool for a wall magnet anchor system being used to cut a hole in a wall to mount an anchor in the wall, in accordance with some embodiments.

FIGS. 10-13 show a sequence for installing an anchor in a wall. FIG. 10 shows a side view of an installation tool 102 for a wall magnet anchor system being used to cut a hole in a wall 150 to mount an anchor 103 in the wall 150, in accordance with some embodiments. The wall 150 can be a conventional drywall construction, either before or after being finished (e.g. painted/surfaced). Initially, the center pilot 106 makes contact with the wall at a point that will be the center of the anchor 103. The user can grip the tool 102 at the gripping portion and turn it about its axis as indicated by line 152. The helical cutting edge 134 of the center pilot 106 will cut a hole for the center pilot 106 and allow the cutting teeth 108 to eventually come into contact with the wall 150 and start cutting into the wall 150. FIG. 11 shows the tool having cut through the wall 150, leaving a hole in the wall that has a diameter substantially equal to that of the first end 104 of the tool 102.

Figure 12:
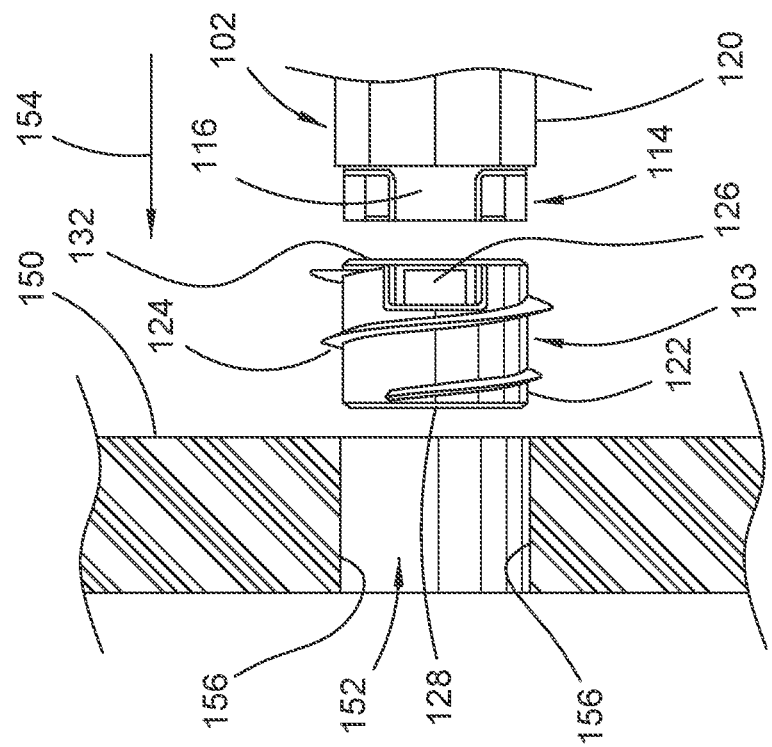
FIG. 12 shows a side view of an installation tool for a wall magnet anchor system being used to install an anchor in the wall, in accordance with some embodiments.
Figure 13:
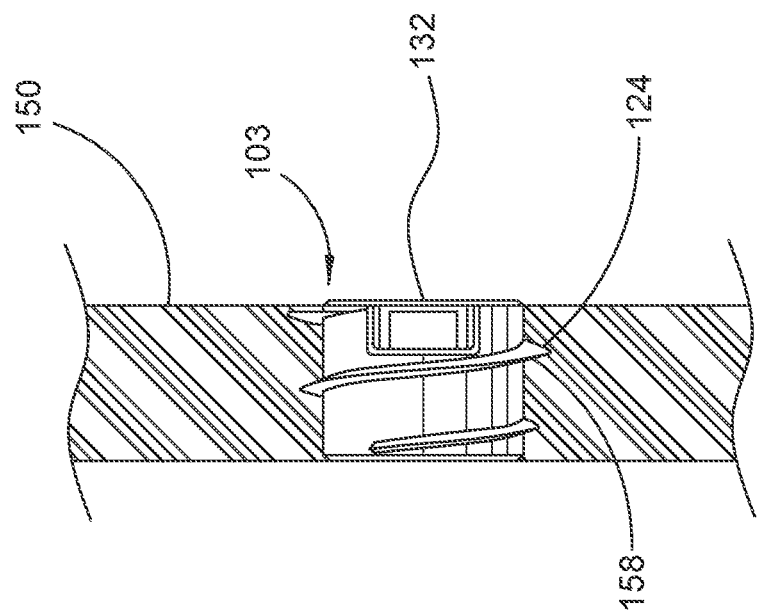
FIG. 13 shows a side view of an anchor mounted in a wall for a wall magnet anchor system, in accordance with some embodiments.

In FIG. 12 the tool 102 has been removed and flipped around so that the second end 114 is facing the hole 152. The anchor 103 is aligned with the hole 152 so that the back end 128 enters first. The protrusions 116 of the tool 102 engage the slots 126 at the front end 132 of the anchor 103 when the tool 102 is moved in the direction of arrow 154. The tool 102 can then be turned about its elongated axis to cause the anchor 103 to turn, which causes the helical thread 124 to cut into the sides 156 of the hole 152. In FIG. 13 the anchor 103 has been drive completely into the hole, and the helical thread 124 has cut a corresponding counterthread 158 into the wall material at the sides of the hole. As shown here the anchor 103 is positioned such that the front end 132 is about flush with the surface of the wall 150. Accordingly, the front end 132 is flat in a plane perpendicular to an axis (e.g. 112) of the cylindrical body 122 of the anchor 103. In some embodiments the anchor 103 can be countersunk so that the front end 132 is recessed from the surface of the wall 150, so that the front end 132 can be covered with a thin layer of surfacing material to conceal the anchor 103.

Figure 14:
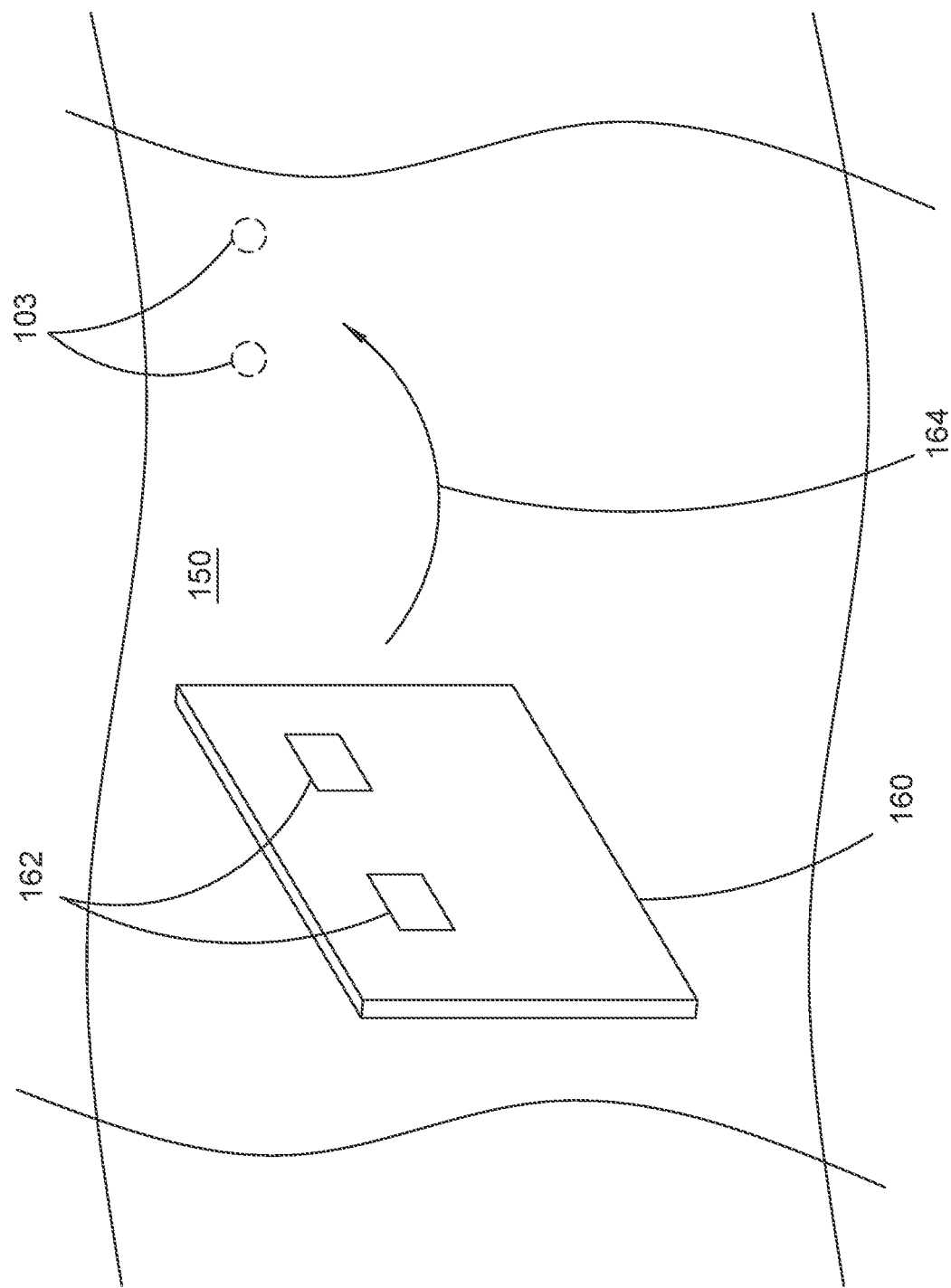
FIG. 14 shows a view of a wall having wall magnet anchors onto which an object is to be placed and retained on the wall, in accordance with some embodiments.
Figure 15:
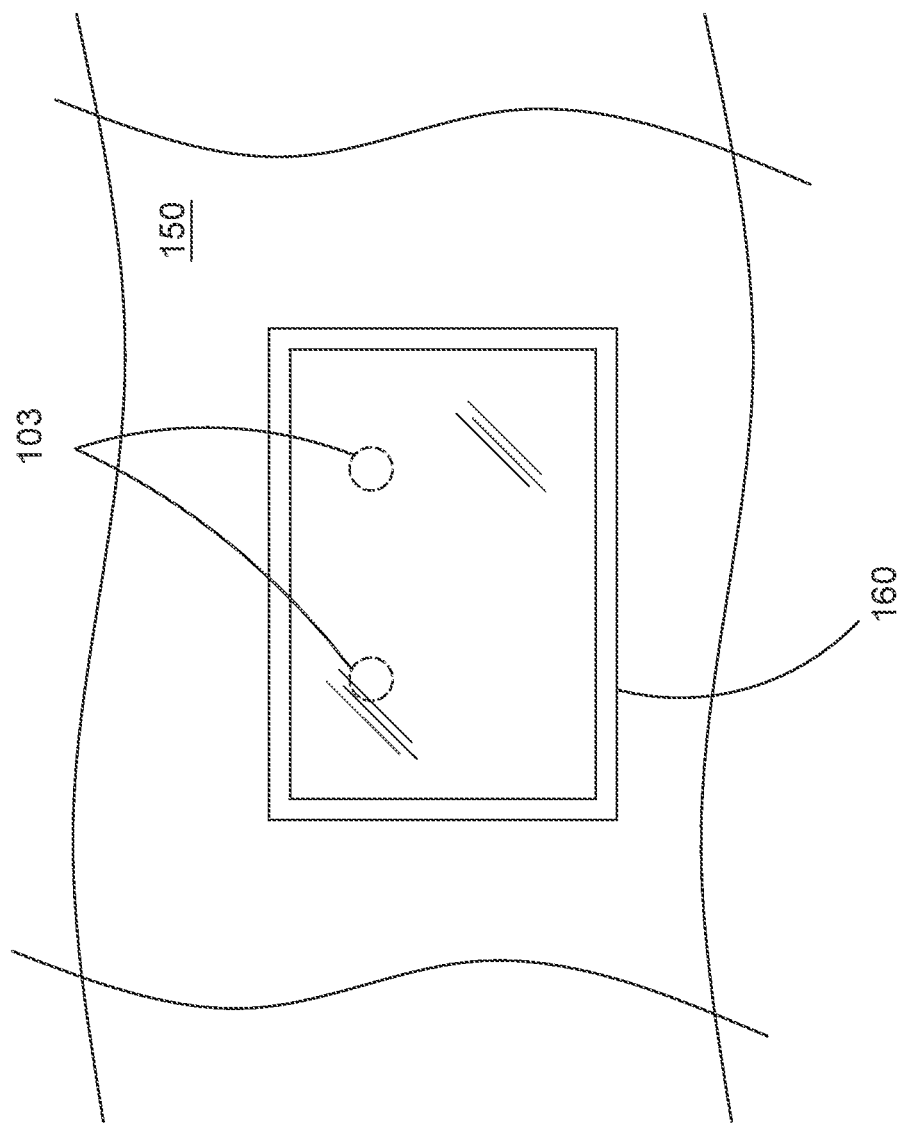
FIG. 15 shows a view of a wall onto which an object is placed and retained on the wall by wall magnet anchors, in accordance with some embodiments.

FIG. 14 shows a view of a wall having wall magnet anchors onto which an object is to be placed and retained on the wall, in accordance with some embodiments. FIG. 15 shows a view of a wall onto which an object is placed and retained on the wall by wall magnet anchors. In FIG. 14 there is shown a pair of anchors 103 mounted in the wall 150. The anchors each contain a magnet as shown, for example, in FIGS. 8-9. An object 160 is to be mounted on the wall 150 and is provided with two mounting elements 162, which are spaced to correspond to the magnets 103. The mounting elements 162 are either a ferrous metal that will be attracted to the magnets, or are also magnets having a polarity orientation such that they will be attracted to the magnets (as opposed to being repelled). The object can be a picture frame or similar object, and is then moved as indicated by arrow 164 such that the mounting elements 162 are each located adjacent to one of the magnets 103 such that the resulting magnetic force hold the object 160 in place on the wall 150 as shown in FIG. 15.

Figure 16:
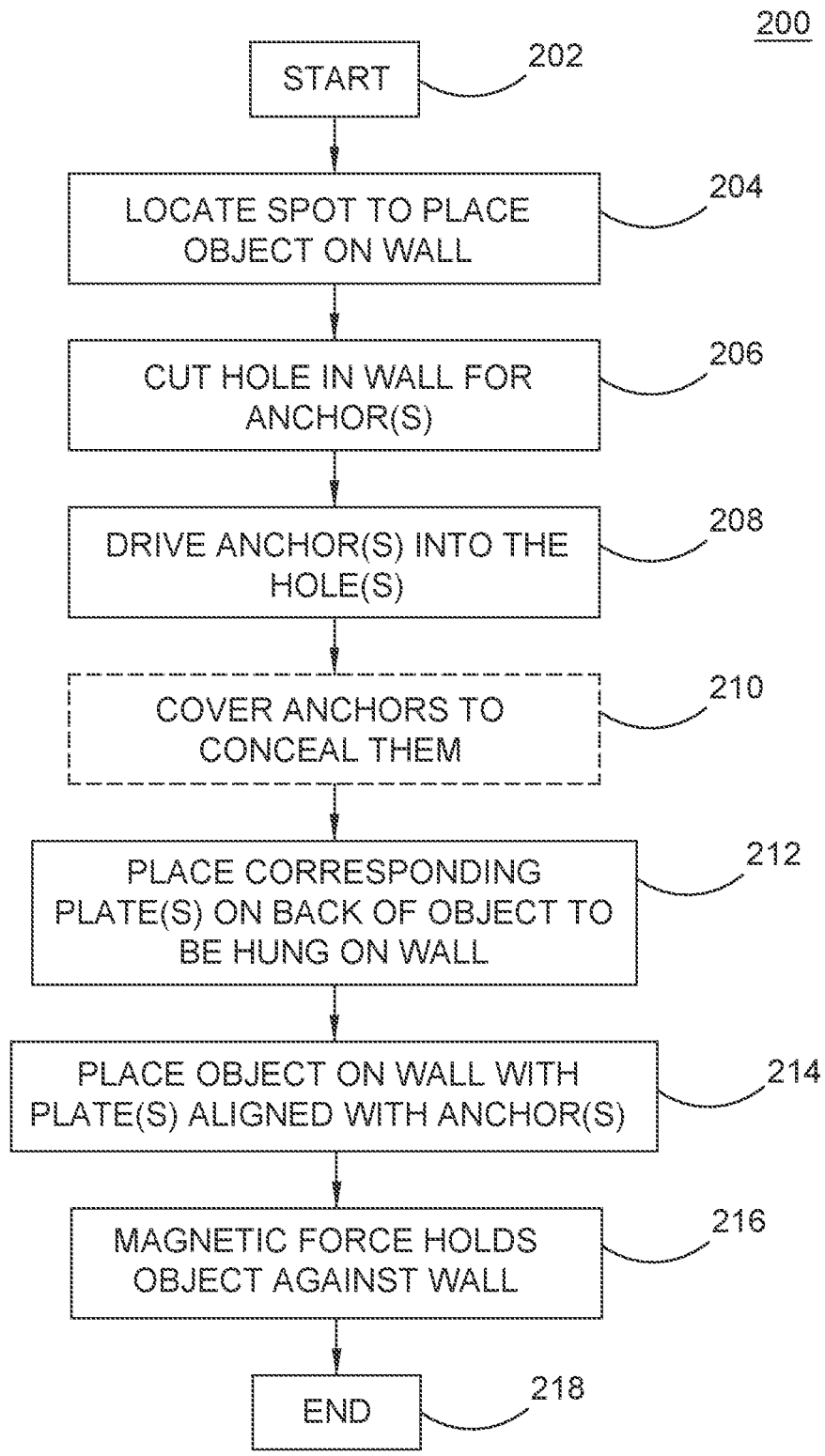
FIG. 16 is a flow chart diagram of a method for installing a wall magnet anchor, in accordance with some embodiments.

FIG. 16 is a flow chart diagram of a method 200 for installing a wall magnet anchor, in accordance with some embodiments. The method 200 covers a process similar to that exemplified by FIGS. 10-15. At the start 202 a user has decided to mount an object on a wall. The user will have an installation tool (e.g. 102) and one or more anchors (e.g. 103) that each have a magnet. In step 204 the user must first decide where the object is to be located, or at least where the anchor(s) is/are to be located for future use. In step 206 the user uses the tool to first cut a hole in the wall using the cutting features of the tool. In step 208, for each hole cut by the user, the user places and drives an anchor into the hole. In step 210, which can be optional, the user can conceal the anchor(s) and finish the wall. In step 212 the user places a mounting element (or more than one) on an object to be hung/mounted on the wall. In step 214 the user places the object on the wall such that the mounting elements ("plates") are directly over a magnet for the greatest magnetic force. In step 216 the object is retained on the wall by magnetic force, and the method 200 ends 218. In some embodiments, the method 200 can be performed to step 210, installing a plurality of concealed anchors in the wall which can optionally be used later to hang objects in accordance with steps 212-216 as the user desires.

FIG. 17 shows a side cutaway view of an installation tool 1702 adapted for use with a hole saw 1704, in accordance with some embodiments. Installation tool 1702 lacks the center pilot 106 and cutting teeth 108, and is instead provided with a pair of hex channels 1710, 1714 at the opposing ends. The hex channels 1710, 1714 are configured to standardized hex driver dimensions to receive a hex drive shaft 1706 of the hole saw (as well as any other tool having a hex driver shaft of the same dimensions). The hole saw 1704 includes a center pilot 1708 for making an initial hole about which an outer saw 1709 will rotate. The outer saw 1709 has an outer diameter that is substantially the same as the outer diameter of a wall magnet anchor, or more specifically, wall magnet anchors can be made to have an outer diameter (not including the helical thread 124) that is the same as that of the outer diameter of the hole saw 1704. The hole saw 1704 and installation tool 1702 can be sold together or separately. The hex channels 1710, 1714 are deep enough from their respective ends of the installation tool 1702 to steadily hold the hex drive shaft 1706, which can be, for example, on the order of one half to one inch. The installation tool 1702, while lacking the cutting features at one end, can include protrusions 116 for driving an anchor into a hole cut by hole saw 1704.

Figure 18B:
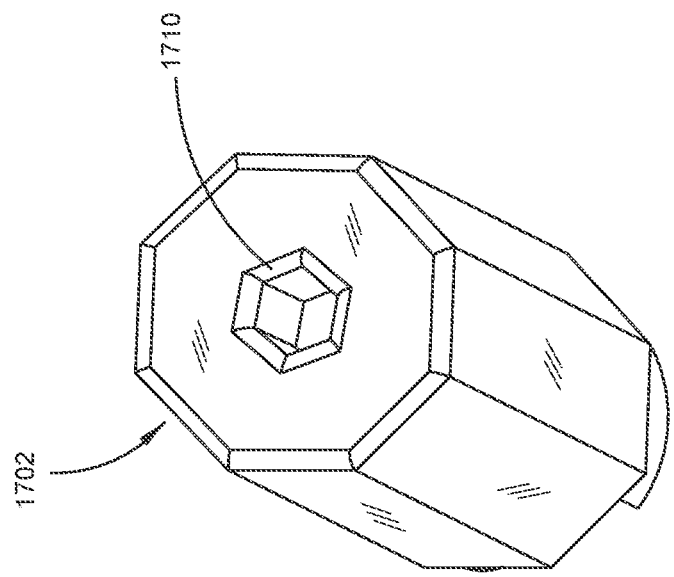
FIG. 18A-18B show isometric views of opposing ends of an installation tool adapted to use a hole saw, in accordance with some embodiments.
Figure 18A:
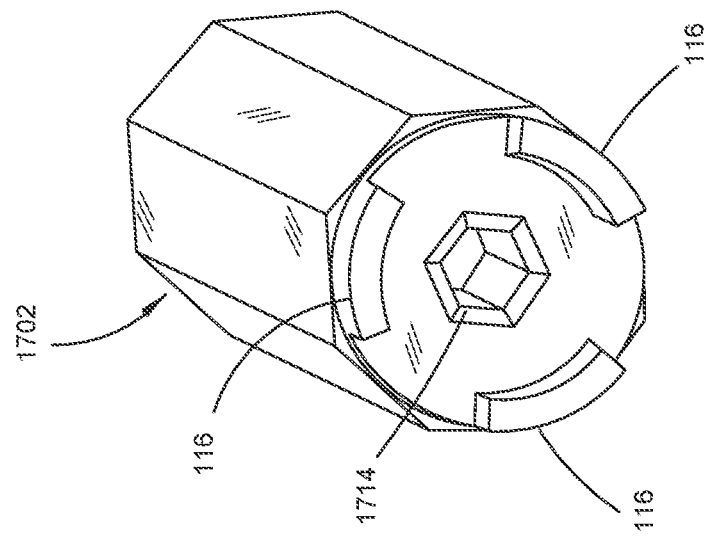

FIG. 18A-18B show isometric views of opposing ends of an installation tool 1702 adapted to use a hole saw, in accordance with some embodiments. In FIG. 18A, hex channel 1714 can be seen having an opening at a relatively flat face, other than for projections 116. FIG. 18B shows the opposite end at which hex channel 1710 is formed, extending inward from the end face. The hex channels 1710, 1714 can receive any hex drive shaft, but are intended to receive the hex drive shaft 1706 of the hole saw 1704.

Figure 19:
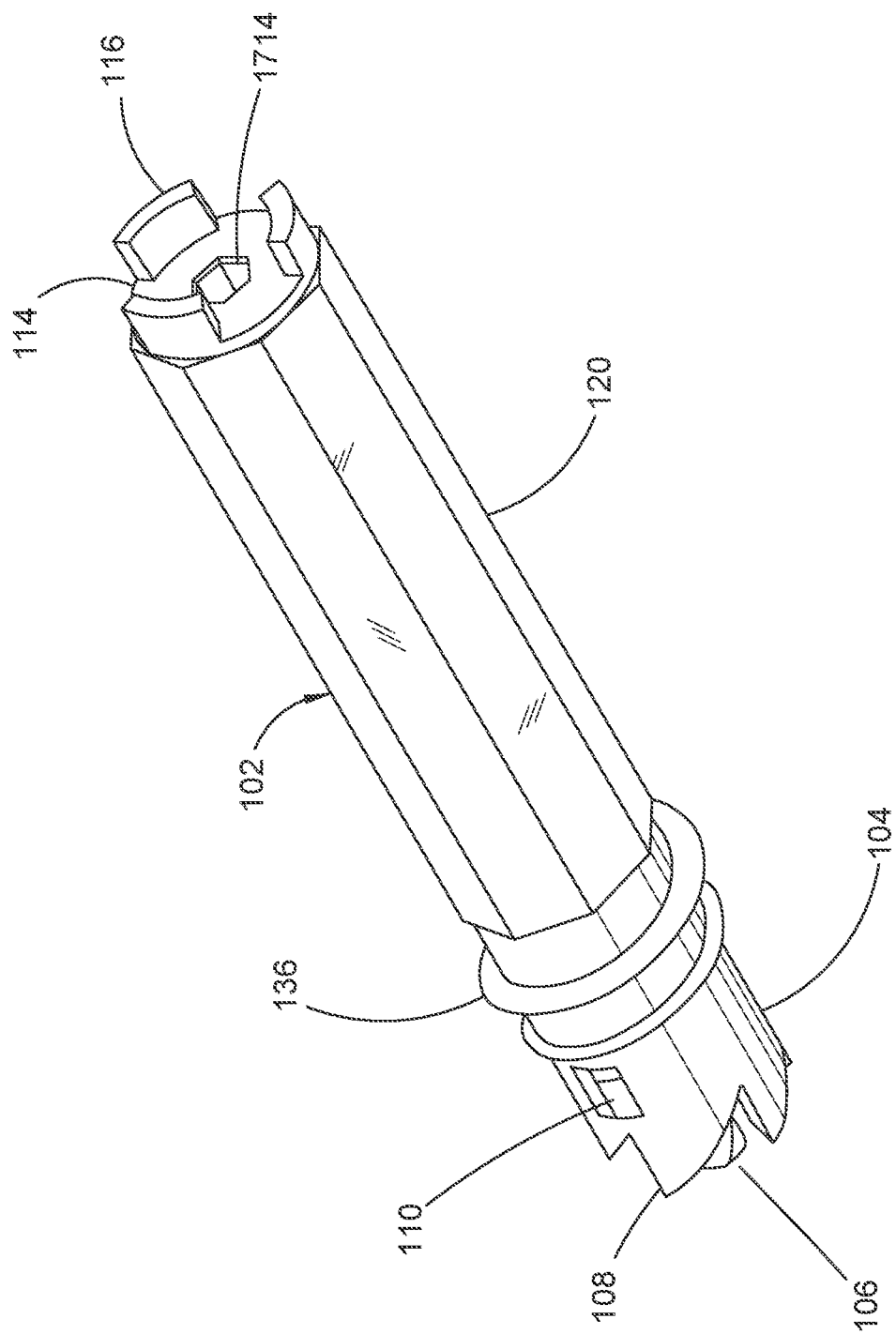
FIG. 19 shows an isometric view of an installation tool having a cutting end and also a socket adapted for use with a hole saw, in accordance with some embodiments.

FIG. 19 shows an isometric view of an installation tool 102 having a cutting end and also a hex socket adapted for use with a hole saw, in accordance with some embodiments. The tool 102 includes a first end 104 and a second end 114. The first end includes a center pilot 106 and cutting teeth 108 arranged in a generally circular form around the center pilot 106. A relief hole 110 allows material to pass out of the tool as it is used to cut a hole in drywall material. A helical thread 136 can be present to tap the drywall material and create a thread to receive the helical thread 124 of an wall anchor. In the event that the cutting teeth 108 are broken or become too dull for practical us, or that a different sized hole is required, and hex channel 1714 is provided at the second end 114 to receive the hex drive shaft of a hole saw.

A wall magnet anchor system has been disclosed the allows objects to be magnetically mounted on a wall. The system includes an installation tool and anchors. The installation tool is an elongated implement having cutting features at one end and anchor engagement feature at the opposite end. The anchors house a magnet and have a thread that hold them in the wall, and specifically in a hole cut by the installation tool. The installation tool has a center pilot and cutting teeth disposed around the center pilot which cut into the wall as the tool is turned. Once the hole is cut, an anchor is aligned with the hole, and the anchor engagement features of the installation tool are interfaced with corresponding features on the anchor, where again, the tool is rotated to drive the anchor into the hole as a helical thread on the outside of the anchor cuts into the side of the hole, thereby retaining the anchor in the hole. The anchor(s) can be slightly counter sunk and concealed, and/or painted over. The anchors, when so installed, eliminate the need for conventional hooks and other hanging hardware that sticks out of the wall. Thus, a plurality of anchors can be mounted, allowing a person to reposition an object as desired without having hook protruding from the wall or nail holes that need to be repaired and resurfaced every time wall hanging objects are repositioned or replaced.

What is claimed is:

1. An anchor for hanging objects on a wall, the anchor comprising:
   a body having a back end and a front end;
   a magnet disposed in the body, wherein a portion of the magnet is adjacent the front end;
   a helical thread helically formed around the body from the back end to the front end of the body;
   a plurality of slots at the front end of the body that extend from an outside of the body into the body and from the front end along the body in a direction toward the back end of the body; and
   wherein the helical thread comprises a bridge portion over at least one slot of the plurality of slots.

2. The anchor of claim 1, wherein the helical thread extends outward from an outside of the body by a distance that increases along the helical thread.

3. The anchor of claim 1, wherein the plurality of slots formed in the body extend into the body from the outside of the body through the body to the magnet.

4. The anchor of claim 1, wherein the magnet is a cylindrical magnet.

5. The anchor of claim 1, wherein the front end of the body is flat and normal to an axis of the body.

6. The anchor of claim 1, wherein the helical thread has a triangular cross sectional profile.

7. An anchor for hanging objects on a wall, the anchor comprising:
   a body having a back end and a front end and a cavity between the back end and the front end;
   a magnet disposed in the cavity of the body against an inside of the front end;
   a helical thread helically formed around the body from the back end to the front end of the body; and
   a plurality of slots at the front end of the body that extend from an outside of the body into the body and from the front end along the body in a direction toward the back end of the body; and
   wherein the helical thread comprises a bridge portion over at least one slot of the plurality of slots.

8. The anchor of claim 7, wherein a height of the helical thread in a direction outward from the body increases along the helical thread from the back end to the front end.

9. The anchor of claim 7, wherein the plurality of slots formed in the body extend into the body from the outside of the body through the body to the magnet.

10. The anchor of claim 7, wherein the magnet is a cylindrical magnet and the cavity is a cylindrical cavity that is sized to hold the magnet in the cavity by friction between an inner wall of the cavity and the magnet.

11. The anchor of claim 7, wherein the front end of the body is flat and normal to an axis of the body.

12. The anchor of claim 7, wherein the helical thread has a triangular cross sectional profile.

13. A magnetic wall anchor device, comprising:
   a cylindrical anchor body having front end and a back end, the front end having a flat front side that is normal to an axis of the cylindrical anchor body;
   a cylindrical cavity formed in the cylindrical anchor body from the back end to an inside of the front side;
   a cylindrical magnet disposed in the cylindrical cavity; and
   a helical thread around an outside of the cylindrical anchor body having a start that is adjacent the back end of the cylindrical anchor body and an end that is adjacent the front end of the cylindrical anchor body, wherein a height of the helical thread, in a direction outward from the axis of the cylindrical anchor body, increases along the helical thread from the start of the helical thread to the end of the helical thread.

14. The magnetic wall anchor device of claim 13, further comprising, the cylindrical anchor body having a plurality of slots at the front end of the cylindrical anchor body that extend from an outside of the cylindrical anchor body into the cylindrical anchor body and from the front end along the cylindrical anchor body in a direction toward the back end of the cylindrical anchor body.

15. The magnetic wall anchor device of claim 14, wherein the helical thread comprises a bridge portion over at least one slot of the plurality of slots.

16. The magnetic wall anchor device of claim 14, wherein the plurality of slots formed in the cylindrical anchor body extend into the cylindrical anchor body from the outside of the cylindrical anchor body through the cylindrical anchor body to the magnet.

17. The magnetic wall anchor device of claim 13, wherein the cylindrical cavity is sized to hold the cylindrical magnet in the cylindrical cavity by friction between an inner wall of the cylindrical cavity and the cylindrical magnet.

\* \* \* \* \*